(12) United States Patent
Oya et al.

(10) Patent No.: US 10,006,328 B2
(45) Date of Patent: Jun. 26, 2018

(54) EXHAUST HEAT RECOVERY DEVICE STRUCTURE

(71) Applicant: TOYOTA JIDOSHA KABUSHIKI KAISHA, Toyota-shi, Aichi-ken (JP)

(72) Inventors: Takeshi Oya, Nisshin (JP); Toshio Murata, Toyota (JP); Takato Ishihata, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 14/882,912

(22) Filed: Oct. 14, 2015

(65) Prior Publication Data

US 2016/0186625 A1   Jun. 30, 2016

(30) Foreign Application Priority Data

Dec. 24, 2014   (JP) .................................. 2014-260459

(51) Int. Cl.
| *F01N 3/00* | (2006.01) |
| *F01N 3/02* | (2006.01) |
| *F01N 3/04* | (2006.01) |
| *F01N 3/10* | (2006.01) |

(Continued)

(52) U.S. Cl.
CPC ............... *F01N 3/043* (2013.01); *F01N 3/02* (2013.01); *F01N 3/10* (2013.01); *F01N 5/02* (2013.01); *F01N 13/009* (2014.06); *F01N 2240/02* (2013.01); *Y02T 10/16* (2013.01); *Y02T 10/20* (2013.01)

(58) Field of Classification Search
CPC ...... F01N 13/009; F01N 2240/02; F01N 3/02; F01N 3/043; F01N 3/10; F01N 5/02; Y02T 10/16
USPC .................................................... 60/298, 320
See application file for complete search history.

(56) References Cited

U.S. PATENT DOCUMENTS 5,662,072 A * 9/1997 Suzuki ................... F01P 11/029
123/142.5 R
6,141,961 A * 11/2000 Rinckel ................... F01N 3/043
60/274

(Continued)

FOREIGN PATENT DOCUMENTS

| JP | 2004-011512 A | 1/2004 |
| JP | 2006-161593 A | 6/2006 |

(Continued)

*Primary Examiner* — Phutthiwat Wongwian
*Assistant Examiner* — Diem Tran
(74) *Attorney, Agent, or Firm* — Oliff PLC

(57) ABSTRACT

An exhaust heat recovery device structure includes: an exhaust pipe; a catalytic converter that is connected to the exhaust pipe; an exhaust heat recovery device that is disposed further toward a vehicle rear side than the catalytic converter, and is disposed at an inner side of a floor tunnel that is formed at a vehicle floor portion, and a water pipe of cooling water is connected to a vehicle transverse direction one side of the exhaust heat recovery device, and the exhaust heat recovery device carries out heat exchange between the cooling water and the gas; and a connecting pipe that, at the inner side of the floor tunnel, connects the catalytic converter and the exhaust heat recovery device, and that is bent or curved toward the vehicle transverse direction one side with respect to a vehicle front side.

7 Claims, 4 Drawing Sheets

(51) Int. Cl.
  *F01N 5/02*   (2006.01)
  *F01N 13/00*   (2010.01)

(56) References Cited

U.S. PATENT DOCUMENTS

| | | | |
|---|---|---|---|
| 8,341,951 B2 * | 1/2013 | Prior | F01N 3/043 60/287 |
| 2012/0186905 A1 | 7/2012 | Matsushima et al. | |
| 2013/0133963 A1 * | 5/2013 | Ajisaka | B60K 11/04 180/68.1 |
| 2013/0269663 A1 | 10/2013 | Nishiyama et al. | |

FOREIGN PATENT DOCUMENTS

| | | |
|---|---|---|
| JP | 2007-187139 A | 7/2007 |
| JP | 2007-285141 A | 11/2007 |
| JP | 2007-303425 A | 11/2007 |
| JP | 2012-132394 A | 7/2012 |
| JP | 2012-154248 A | 8/2012 |
| JP | 2013-170508 A | 9/2013 |
| JP | 2014-095362 A | 5/2014 |
| WO | 2010/113677 A1 | 10/2010 |

* cited by examiner

EXHAUST HEAT RECOVERY DEVICE STRUCTURE

CROSS-REFERENCE TO RELATED APPLICATION

This application is based on and claims priority under 35 USC 119 from Japanese Patent Application No. 2014-260459 filed Dec. 24, 2014, the disclosure of which is incorporated by reference herein.

BACKGROUND

Technical Field

The present invention relates to an exhaust heat recovery device structure.

Related Art

A technique is known in which an exhaust heat recovery device is connected to an exhaust pipe that exhausts gas that has been generated at an internal combustion engine, and cooling water of the internal combustion engine such as an engine or the like is heated by the gas within the exhaust pipe, and warming-up of the internal combustion engine is promoted. As such an exhaust heat recovery device structure, Japanese Patent Application Laid-Open (JP-A) No. 2006-161593 discloses an exhaust heat recovery device structure in which a catalyst system (a catalytic converter) that purifies gas and an exhaust heat recovery device are connected rectilinearly by the exhaust pipe. Further, JP-A No. 2013-170508 discloses an exhaust heat recovery device structure that introduces outside air into an exhaust heat recovery device and cools cooling water.

However, in the structure of JP-A No. 2013-170508, the exhaust pipe is laid so as to circumvent the radiator (heat exchanger) as seen in plan view, and therefore, space for arranging the peripheral parts is limited. On the other hand, if the catalytic converter and the exhaust heat recovery device are connected rectilinearly as in JP-A No. 2006-161593, the exhaust heat recovery device can be disposed at the inner side of the floor tunnel. However, work space is needed in order to connect a cooling water pipe to the exhaust heat recovery device. Therefore, there is room for improvement in order to ensure work space for carrying out connection of pipes and the like, without widening the cross-section of the floor tunnel.

SUMMARY

In view of the above-described circumstances, an object of the present invention is to provide, in a structure in which an exhaust heat recovery device is disposed in a floor tunnel, an exhaust heat recovery device structure that can ensure work space without widening the cross-section of the floor tunnel An exhaust heat recovery device structure of a first aspect of the present invention includes: an exhaust pipe that extends in a vehicle longitudinal direction, and from which gas, that is generated at an internal combustion engine, is exhausted; a catalytic converter that is connected to the exhaust pipe; an exhaust heat recovery device that is disposed further toward a vehicle rear side than the catalytic converter, and is disposed at an inner side of a floor tunnel that is formed at a vehicle floor portion, and a water pipe of cooling water that cools the internal combustion engine is connected to a vehicle transverse direction one side of the exhaust heat recovery device, and the exhaust heat recovery device carries out heat exchange between the cooling water and the gas; and a connecting pipe that, at the inner side of the floor tunnel, connects the catalytic converter and the exhaust heat recovery device, and that is bent or curved toward the vehicle transverse direction one side with respect to a vehicle front side.

In the exhaust heat recovery device structure of the first aspect of the present invention, the catalytic converter is connected to the vehicle rear side end portion of the exhaust pipe that extends in the vehicle longitudinal direction. The exhaust heat recovery device is disposed further toward the vehicle rear side than this catalytic converter. Here, a water pipe of cooling water that cools the internal combustion engine is connected to a vehicle transverse direction one side of the exhaust heat recovery device. Therefore, heat exchange can be carried out between the cooling water and the gas that flow through the interior of the exhaust heat recovery device. Due thereto, for example, by heating the cooling water by gas that is exhausted from the engine immediately after start-up of the engine, warming-up of the engine can be promoted.

Further, the exhaust heat recovery device is disposed at the inner side of the floor tunnel (tunnel portion) that is formed at the vehicle floor portion. Further, this exhaust heat recovery device and the catalytic converter are connected by the connecting pipe that is provided at the inner side of the floor tunnel. Here, as seen in plan view, the connecting pipe is, with respect to the vehicle front side thereof, bent or curved toward the vehicle transverse direction one side. Namely, the connecting pipe is bent or curved toward the side at which the water pipe is connected to the exhaust heat recovery device. Due thereto, as compared with a structure in which the connecting pipe extends rectilinearly in the vehicle longitudinal direction, the gap between the wall surface of the tunnel portion and the connecting pipe at the vehicle transverse direction one side where the water pipe is connected, can be ensured to be wide.

In an exhaust heat recovery device structure of a second aspect of the present invention, in the first aspect, the water pipe is disposed at a bending inner side or a curving inner side of the connecting pipe.

In the exhaust heat recovery device structure of the second aspect of the present invention, by placing the water pipe at the bending inner side or the curving inner side of the connecting pipe, traveling wind can effectively hit the water pipe as compared with a structure in which the connecting pipe extends rectilinearly in the vehicle longitudinal direction. As a result, rising of the temperature of the water pipe can be suppressed. Note that, here, "bending inner side" and "curving inner side" mean the side where the radius of curvature of the connecting pipe is small as seen in plan view.

In an exhaust heat recovery device structure of a third aspect of the present invention, in the second aspect, the water pipe is a tube body that is made of resin and that connects the internal combustion engine and a metal pipe that extends-out from the exhaust heat recovery device, and the water pipe and the metal pipe are connected at a position that overlaps the connecting pipe as seen from a vehicle transverse direction.

In the exhaust heat recovery device structure of the third aspect of the present invention, by connecting the water pipe that is made of resin and the metal pipe at a position that overlaps the connecting pipe as seen from the vehicle transverse direction, the connected portion is disposed at a region that is at the bending inner side or the curving inner side of the connecting pipe. Here, at the region that is at the bending inner side or the curving inner side of the connecting pipe, the gap between the connecting pipe and the floor tunnel is wide. Therefore, rising of the temperature of the connected portion of the water pipe and the metal pipe can be suppressed.

In an exhaust heat recovery device structure of a fourth aspect of the present invention, in any one of the first through third aspects, a flow path of the gas at the exhaust heat recovery device is structured to include a main flow path at which heat exchange with the cooling water is not carried out and a bypass flow path at which heat exchange with the cooling water is carried out, and a valve that can open and close the main flow path or the bypass flow path is provided at the exhaust heat recovery device, and a bearing of the valve is disposed at an inner wall, that is positioned at a bending inner side or a curving inner side of the connecting pipe, of the exhaust heat recovery device.

In the exhaust heat recovery device structure of the fourth aspect of the present invention, the exhaust heat recovery device is structured to include a main flow path at which heat exchange with the cooling water is not carried out, and a bypass flow path at which heat exchange with the cooling water is carried out. Further, a valve that can open and close the main flow path or the bypass flow path is provided at the exhaust heat recovery device. Due thereto, by opening and closing the valve, the flow rate of the gas that flows through the bypass flow path can be adjusted. As a result, for example, in a case of promoting warming-up of the internal combustion engine, the flow rate of the gas that flows through the bypass flow path can be increased and heat exchange with the cooling water can be carried out, and, after warming-up, the flow rate of the gas that flows through the bypass flow path can be reduced and it can be made such that heat exchange with the cooling water is not carried out.

Further, the gas, that has flowed into the exhaust heat recovery device from the catalytic converter via the connecting pipe, attempts to advance straight toward the vehicle rear side (the gas exhausting direction downstream side), and therefore, it is difficult for the gas to hit the inner wall that is at the bending inner side or the curving inner side of the exhaust heat recovery device. Due thereto, by placing the bearing of the valve at the inner wall that is at the bending inner side or the curving inner side of the exhaust heat recovery device, this bearing becoming high temperature due to the heat of the gas can be suppressed.

As described above, in accordance with the exhaust heat recovery device structure of the first aspect of the present invention, there is the excellent effect that the work space for connecting the exhaust heat recovery device and the water pipe can be ensured at the interior of the floor tunnel, without widening the cross-section of the floor tunnel.

In accordance with the exhaust heat recovery device structure of the second aspect of the present invention, there is the excellent effect that deterioration of the water pipe due to heat can be suppressed.

In accordance with the exhaust heat recovery device structure of the third aspect of the present invention, there is the excellent effect that the connected state between the metal pipe at the exhaust heat recovery device side and the water pipe that is made of resin can be maintained well.

In accordance with the exhaust heat recovery device structure of the fourth aspect of the present invention, there is the excellent effect that deterioration, due to heat, of the bearing of the valve, that opens and closes the main flow path or the bypass flow path of the exhaust heat recovery device, can be suppressed.

BRIEF DESCRIPTION OF THE DRAWINGS

Exemplary embodiments of the present invention will be described in detail based on the following figures, wherein.

DETAILED DESCRIPTION

Figure 1:
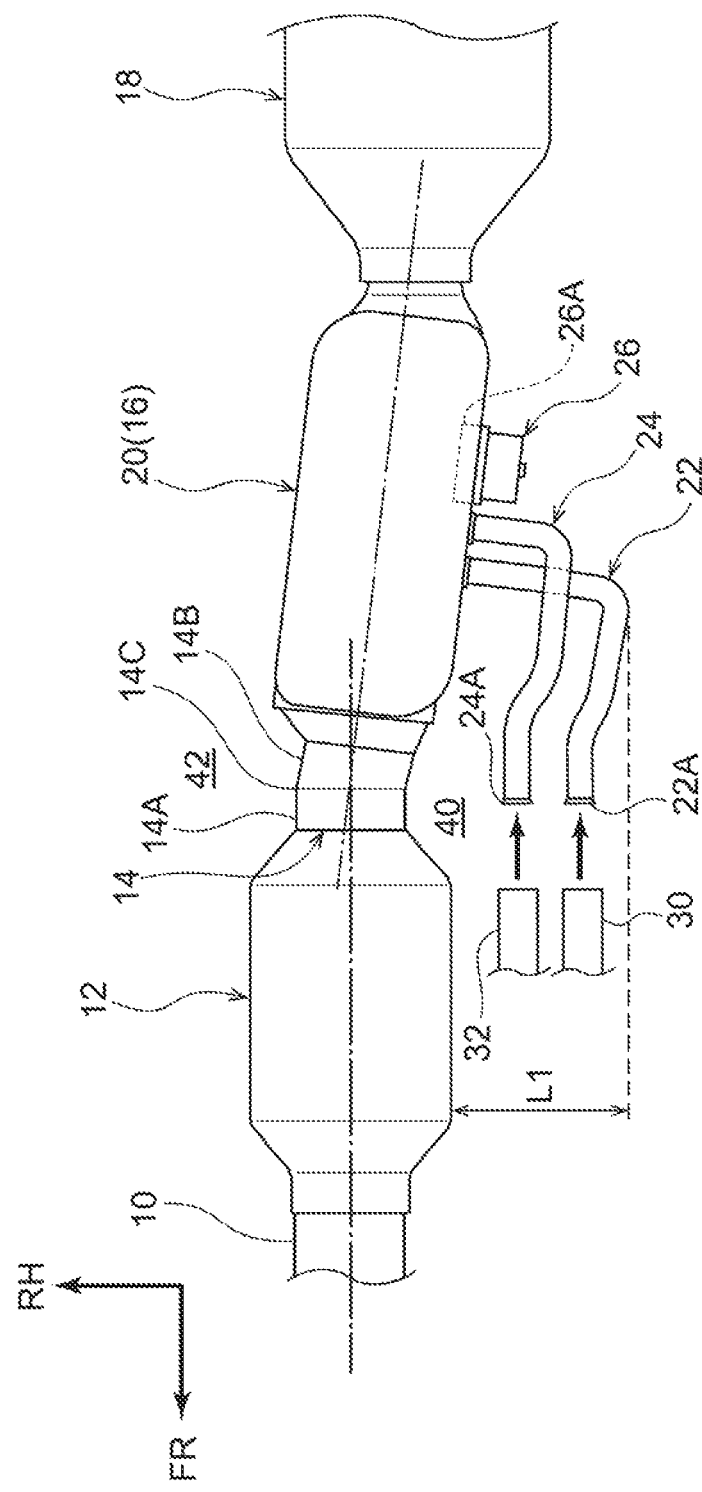
FIG. 1 is a plan view showing an exhaust heat recovery device structure relating to an embodiment.
Figure 2:
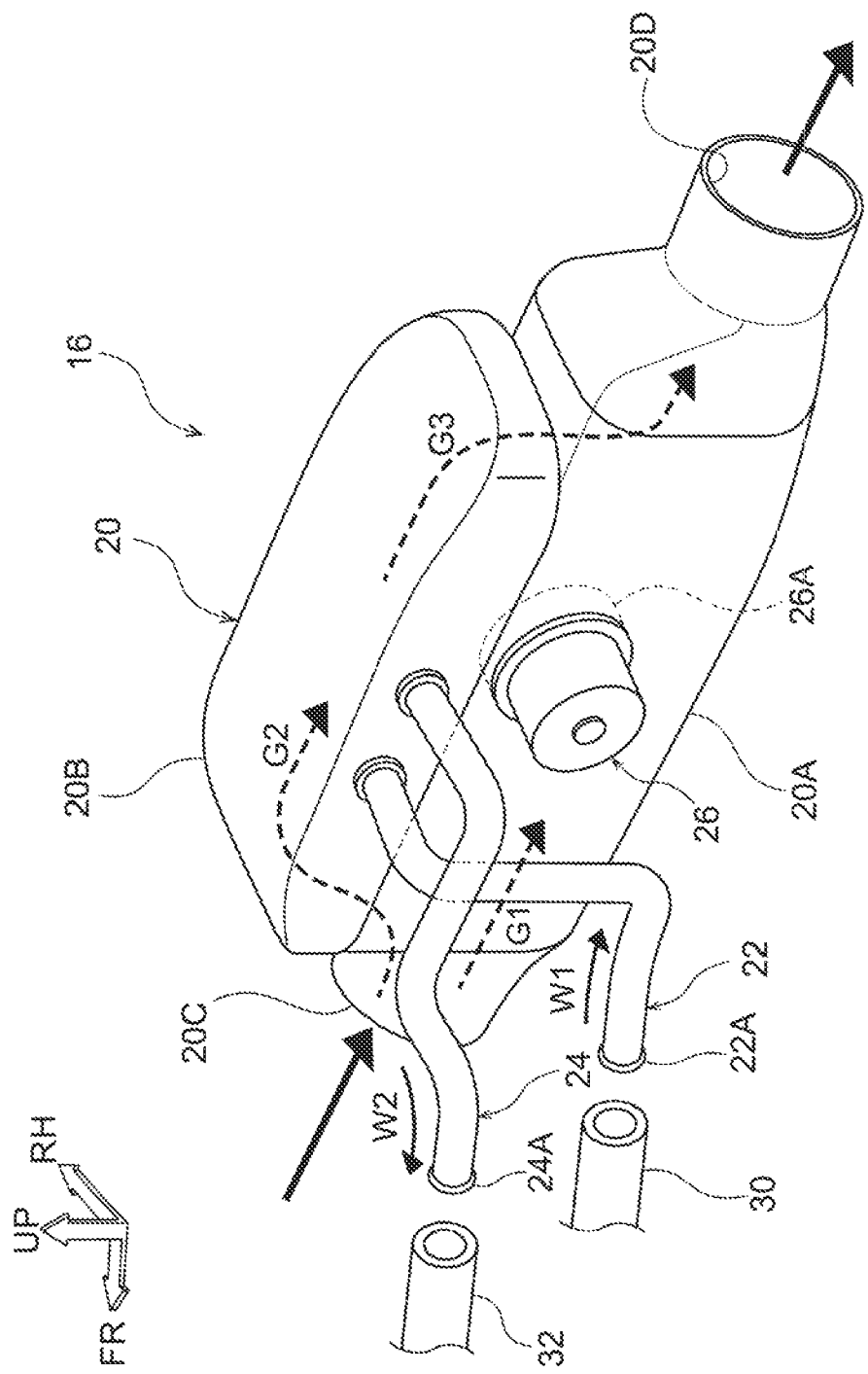
FIG. 2 is a perspective view showing an exhaust heat recovery device that structures the exhaust heat recovery device structure relating to the embodiment.
Figure 3:
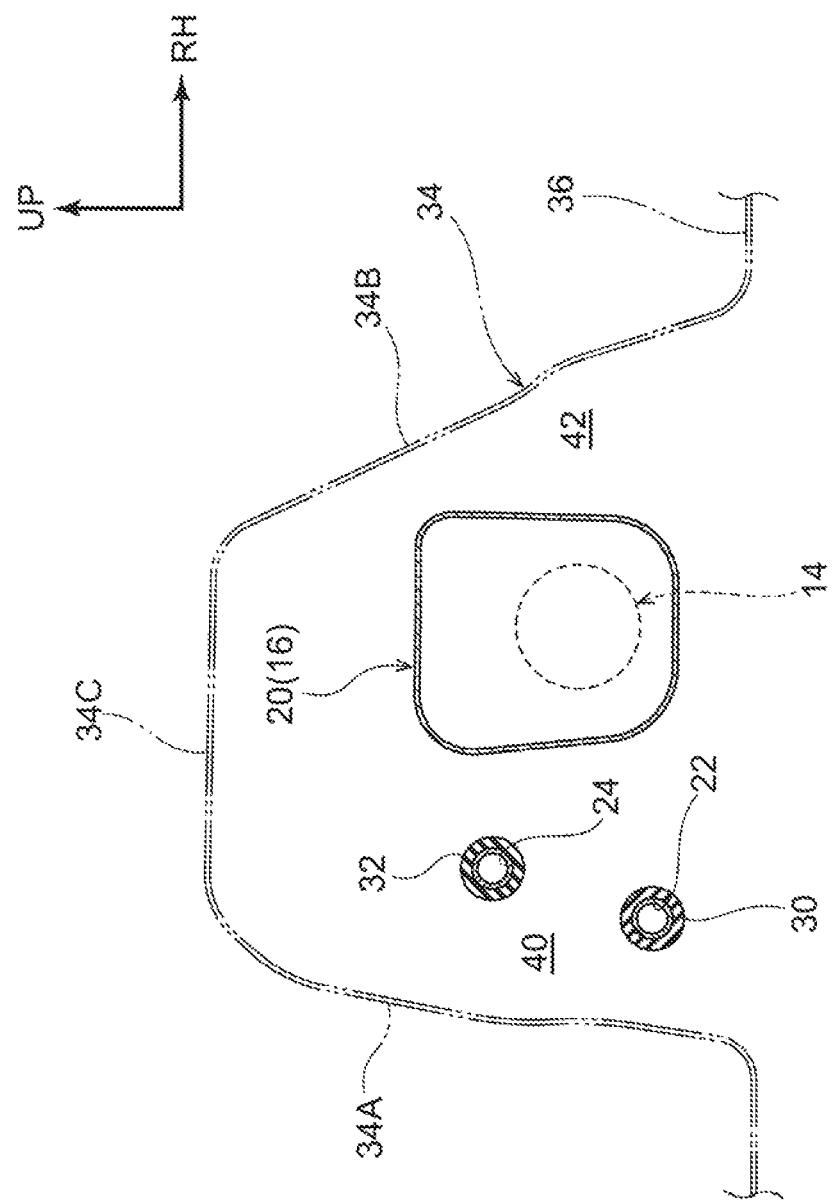
FIG. 3 is a cross-sectional view in which the exhaust heat recovery device relating to the embodiment is viewed from the vehicle rear side, and is a drawing showing the positional relationship with a floor tunnel.

An exhaust heat recovery device structure relating to an embodiment of the present invention is described on the basis of FIG. 1 through FIG. 3. Note that arrow FR that is shown appropriately in the respective drawings indicates the vehicle front side, arrow UP indicates the vehicle upper side, and arrow RH indicates the vehicle transverse direction outer side. Further, in the following description, when longitudinal, vertical, and left-right directions are used without being specified, they indicate the longitudinal of the vehicle longitudinal direction, the vertical of the vehicle vertical direction, and the left and right when facing in the advancing direction.

(Overall Structure of Exhaust Heat Recovery Structure)

As shown in FIG. 1, an exhaust heat recovery device structure is structured to include an exhaust pipe 10, a catalytic converter 12, a connecting pipe 14, and an exhaust heat recovery device 16, in that order from the vehicle front side (the upstream side in the gas exhausting direction). Further, a muffler 18 for reducing exhaust noise is connected to the vehicle rear side of (i.e., further toward the gas exhausting direction downstream side than) the exhaust heat recovery device 16.

The exhaust pipe 10 is a pipe body that is made of metal and extends substantially rectilinearly in the vehicle longitudinal direction. The vehicle front side end portion of the exhaust pipe 10 is connected to an unillustrated engine that serves as an internal combustion engine. Further, the catalytic converter 12 is connected to the vehicle rear side end portion of the exhaust pipe 10.

The catalytic converter 12 is a tubular member that extends in the vehicle longitudinal direction and whose both end portions are open. A catalyst support for purifying gas is provided at the interior of the catalytic converter 12. The catalyst support is formed of a material that is electrically conductive and is rigid. An electrically conductive ceramic, an electrically conductive resin, a metal and the like can be used as examples of the catalyst support. Note that the catalyst support is not limited to these, and another catalyst support may be used provided that it is a material that can purify substances (carbon and the like) within the gas (the exhaust) that flows through the interior of the catalytic converter 12.

Further, in the present embodiment, as an example, two electrodes may be affixed to a catalyst support, and, by applying voltage between these electrodes, the catalyst support may be energized and heated, and the purifying action of the catalyst can be made to be exhibited better.

The exhaust heat recovery device 16 is disposed further toward the gas exhausting direction downstream side than the catalytic converter 12 that is structured as described above. The exhaust heat recovery device 16 and the catalytic converter 12 are connected in the vehicle longitudinal direction by the connecting pipe 14. The connecting pipe 14 is described later.

The exhaust heat recovery device 16 is structured to include mainly a main body portion 20, a metal pipe 22 and a metal pipe 24 that extend-out from the main body portion 20, and a control valve 26 that is mounted to the main body portion 20. Further, as shown in FIG. 3, the exhaust heat recovery device 16 of the present embodiment is disposed at the inner side of a floor tunnel 34. Concretely, the floor tunnel 34 is formed due to a vehicle transverse direction intermediate portion of a floor panel 36, that serves as a vehicle floor portion, being bulged-out toward the vehicle upper side. Further, the floor tunnel 34 has a left wall portion 34A at the vehicle left side, a right wall portion 34B at the vehicle right side, and an upper wall portion 34C that connects the upper end of the left wall portion 34A and the upper end of the right wall portion 34B. The cross-section of the floor tunnel 34 is formed in a substantial U-shape that opens toward the vehicle lower side. Further, the exhaust heat recovery device 16 is disposed in the space between the left wall portion 34A and the right wall portion 34B.

As shown in FIG. 1, as seen in plan view, the main body portion 20 of the exhaust heat recovery device 16 is disposed at an incline with respect to the vehicle longitudinal direction such that the rear end side is positioned at the vehicle left side with respect to the front end portion. Further, as shown in FIG. 2, the main body portion 20 has a main pipe portion 20A that structures a main flow path at which heat exchange between cooling water and gas is not carried out, and a bypass pipe portion 20B that structures a bypass flow path at which heat exchange between the cooling water and the gas is carried out. The main pipe portion 20A structures the lower portion of the exhaust heat recovery device 16. A gas introduction port 20C and a gas lead-out port 20D are formed at the length direction both end portions of this main pipe portion 20A. Moreover, the control valve 26 is mounted to the wall surface at the vehicle left side of the main pipe portion 20A.

Here, a bearing 26A of the control valve 26 is provided at the inner wall at the vehicle left side of the main pipe portion 20A. The bearing 26A is formed of a stainless wire mesh, and is structured such that an unillustrated valve main body can be rotated via this bearing 26A. Further, by rotating the valve main body, the flow path at the interior of the main pipe portion 20A (the main flow path) can be opened and closed.

On the other hand, the bypass pipe portion 20B is provided above the main pipe portion 20A. Here, unillustrated communication holes are formed at two places that are the vehicle front side end portion and the vehicle rear side end portion of the bypass pipe portion 20B, and the main flow path and the bypass flow path communicate via these communication holes. Due thereto, for example, in the case of the state in which the control valve 26 is completely open, the main pipe portion 20A is open, and therefore, the majority of the gas, that has been introduced into the main body portion 20 of the exhaust heat recovery device 16 from the gas introduction port 20C, advances straight, and passes-through the interior of the main pipe portion 20A (arrow G1 in FIG. 2). Then, the gas is led-out as is from the gas lead-out port 20D to the muffler 18 that is described later.

Further, in the case of the state in which the control valve 26 is completely closed, the main flow path of the main pipe portion 20A is closed. Therefore, all of the gas, that has been introduced into the main body portion 20 from the gas introduction port 20C, passes-through the unillustrated communication hole and flows through the bypass pipe portion 20B (arrow G2 in FIG. 2). Then, the gas returns to the main pipe portion 20A from the communication hole at the rear end side of the bypass pipe portion 20B, and is led-out from the gas lead-out port 20D (arrow G3 in FIG. 2). In this way, by controlling the control valve 26, the flow path of gas can be switched between the main flow path within the main pipe portion 20A and the bypass flow path within the bypass pipe portion 20B.

Further, in the present embodiment, an unillustrated actuator is connected to the metal pipe 22 or the metal pipe 24 that are described later. The actuator is structured so as to extend and contract in accordance with the temperature of the cooling water, and the control valve 26 is opened and closed in accordance with the extension/contraction of the actuator. Concretely, in a case in which the control valve 26 is in the initial state and the closed state and the temperature of the cooling water is less than a predetermined temperature, the closed state of the control valve 26 is maintained. Further, as the temperature of the cooling water rises, the actuator extends and rotates the control valve 26. Due thereto, the main pipe portion 20A is opened, and at least some of the gas advances straight in the direction of arrow G1 in FIG. 2 and flows through the main flow path.

On the other hand, when the temperature of the cooling water falls, the actuator contracts. Then, the valve main body rotates in the direction of closing the main flow path, due to an unillustrated return spring that is provided at the control valve 26. Due thereto, more gas flows to the bypass pipe portion 20B.

Here, the metal pipe 22 and the metal pipe 24 extend-out at the wall surface at the vehicle left side of the bypass pipe portion 20B. The metal pipe 22 and the metal pipe 24 extend-out at the vehicle left side from a vehicle longitudinal direction intermediate portion of the bypass pipe portion 20B, and the metal pipe 22 extends-out from a position of the bypass pipe portion 20B that is further toward the vehicle front side than the metal pipe 24.

Further, the end portions of the metal pipe 22 and the metal pipe 24 extend-out toward the vehicle front side, and a water pipe 30 and a water pipe 32, that are tube bodies made of resin, are connected to the metal pipe 22 and the metal pipe 24. Namely, the water pipe 30 and the water pipe 32 are connected to the vehicle left side (a vehicle transverse direction one side) of the exhaust heat recovery device 16. Concretely, one end portion of the water pipe 30 is inserted, via a sealing member such as an O-ring or the like, into an end portion 22A of the metal pipe 22, and is fastened by an unillustrated fastener. Further, one end portion of the water pipe 32 is inserted, via a sealing member such as an O-ring or the like, into an end portion 24A of the metal pipe 24, and is fastened by an unillustrated fastener.

The other end portions of the water pipe 30 and the water pipe 32 are respectively connected to the unillustrated engine. Further, cooling water flows into the engine from the water pipe 32, and, after being circulated through the engine interior, the cooling water flows into the water pipe 30. Then, from the water pipe 30, the cooling water passes-through the metal pipe 22 and flows into the bypass pipe portion 20B (arrow W1 in FIG. 2). Further, the metal pipe 22 and the metal pipe 24 are connected at the interior of the bypass pipe portion 20B. Therefore, the cooling water, that has flowed into the bypass pipe portion 20B from the metal pipe 22, flows through the interior of the bypass pipe portion 20B, and thereafter, flows through the metal pipe 24 to the water pipe 32 (arrow W2 in FIG. 2). Then, the cooling water passes-through the water pipe 32 and is again circulated within the engine.

Here, the cooling water flow path that is disposed at the interior of the bypass pipe portion 20B is heated by the gas that flows-through the bypass pipe portion 20B. Therefore, the cooling water, that flows-through the bypass flow path at the interior of the bypass pipe portion 20B, is heated by the gas. Namely, heat exchange is carried out between the cooling water and the gas.

As shown in FIG. 1, the muffler 18 is disposed further toward the gas exhausting direction downstream side than the exhaust heat recovery device 16. The muffler 18 extends in a substantially rectilinear shape in the vehicle longitudinal direction. The end portion at the vehicle front side (the gas exhausting direction upstream side) of the muffler 18 is connected to the gas lead-out port 20D of the exhaust heat recovery device 16 (see FIG. 2). Further, the end portion at the vehicle rear side (the gas exhausting direction upstream side) of the muffler 18 opens to the atmosphere. Therefore, there is a structure in which, the gas, that has been led-out from the exhaust heat recovery device 16 to the muffler 18, passes-through the interior of the muffler 18, and the exhaust noise is decreased, and the gas is exhausted out into the atmosphere.

(Structure of Connecting Pipe)

The catalytic converter 12 and the exhaust heat recovery device 16 are connected by the connecting pipe 14. Here, the connecting pipe 14 is disposed at the inner side of the floor tunnel 34, in the same way as the exhaust heat recovery device 16 (see FIG. 2). Further, a bent portion 14C is provided at an intermediate portion in the vehicle longitudinal direction of the connecting pipe 14. As seen in plan view, a rear portion 14B, that is further toward the vehicle rear side than the bent portion 14C, is bent toward the vehicle left side (a vehicle transverse direction one side) with respect to a front portion 14A that is at the vehicle front side. Therefore, in the present embodiment, the vehicle left side, where the radius of curvature is small at the bent portion 14C of the connecting pipe 14 as seen in plan view, is the bending inner side, and the vehicle right side, where the radius of curvature is large at the bent portion 14C of the connecting pipe 14 as seen in plan view, is the bending outer side.

Here, the metal pipe 22 and the metal pipe 24, that extend-out from the exhaust heat recovery device 16, extend-out to as far as a region 40 that is at the bending inner side of the connecting pipe 14. Further, at this region 40, the metal pipe 22 and the water pipe 30 are connected, and the metal pipe 24 and the water pipe 32 are connected. Concretely, the metal pipe 22 and the water pipe 30 are connected, and the metal pipe 24 and the water pipe 32 are connected, at positions that overlap the connecting pipe 14 as seen from the vehicle transverse direction.

(Operation and Effects)

Operation and effects of the exhaust heat recovery device structure relating to the present embodiment are described next.

In the exhaust heat recovery device structure of the present embodiment, as shown in FIG. 2, the gas flow path within the exhaust heat recovery device 16 is branched-off into the main flow path that is within the main pipe portion 20A and the bypass flow path that is within the bypass pipe portion 20B. Further, the main flow path of the main pipe portion 20A can be opened and closed due to the valve main body of the control valve 26 being rotated. Therefore, in a case of carrying out warming-up after start-up of the engine, the main flow path of the main pipe portion 20A is closed, and gas is made to flow into the bypass pipe portion 20B where heat exchange with the cooling water is carried out. Due thereto, the cooling water that flows-through the interior of the bypass pipe portion 20B is heated, and warming-up can be promoted. Further, after warming up, the valve main body of the control valve 26 is rotated, the main flow path is opened, and gas flows to the main flow path of the main pipe portion 20A where heat exchange with the cooling water is not carried out. Due thereto, the cooling water being heated by the gas is suppressed, and the engine can be cooled.

Further, in the present embodiment, as shown in FIG. 3, the exhaust heat recovery device 16 is disposed at the inner side of the floor tunnel 34, and the water pipe 30 and the water pipe 32 also are disposed at the inner side of the floor tunnel 34. Due thereto, interference with peripheral parts can be suppressed, as compared with a structure in which the exhaust heat recovery device 16 and the water pipe 30 and the water pipe 32 are disposed at other places.

By the way, in a structure in which the exhaust heat recovery device 16 is disposed at the inner side of the floor tunnel 34, the work space for connecting the metal pipe 22 of the exhaust heat recovery device 16 and the water pipe 30, and the work space for connecting the metal pipe 24 and the water pipe 32, become narrow. Therefore, there are cases in which the width of the floor tunnel 34 must be widened in order to ensure the work space.

Here, in the present embodiment, as shown in FIG. 1, the connecting pipe 14 that connects the catalytic converter 12 and the exhaust heat recovery device 16 is bent. Concretely, as seen in plan view, the rear portion 14B of the connecting pipe 14 is bent toward the vehicle left side (a vehicle transverse direction one side) with respect to the front portion 14A. Further, the water pipe 30 and the water pipe 32 are connected to the vehicle left side (the vehicle transverse direction one side) of the exhaust heat recovery device 16. Due thereto, the region 40 at the vehicle left side (bending inner side) of the connecting pipe 14 can be widened, and the work space for connecting the water pipe 30 to the metal pipe 22 can be ensured without increasing the width of the floor tunnel 34. Further, similarly, the works space for connecting the water pipe 32 to the metal pipe 24 also can be ensured.

In particular, in the present embodiment, the exhaust pipe 10 and the catalytic converter 12 are offset further toward the vehicle right side than the vehicle transverse direction central portion of the floor tunnel 34. Further, the exhaust heat recovery device 16 is disposed such that the front end portion of the exhaust heat recovery device 16 is positioned at the left wall portion 34A of the floor tunnel 34, and the rear end portion of the exhaust heat recovery device 16 is positioned at the right wall portion 34B of the floor tunnel 34. Due thereto, as shown in FIG. 3, the region 40 (the gap between the connecting pipe 14 and the left wall portion 34A) at the vehicle left side (the bending inner side) of the connecting pipe 14 can effectively be made to be wider than a region 42 (the gap between the connecting pipe 14 and the right wall portion 34B) at the vehicle right side (the bending outer side) of the connecting pipe 14.

Further, in the present embodiment, as shown in FIG. 1, by bending the connecting pipe 14 and disposing the exhaust heat recovery device 16 so as to be tilted with respect to the vehicle longitudinal direction as seen in plan view, traveling wind can effectively hit the water pipe 30 and the water pipe 32 that are connected to the metal pipe 22 and the metal pipe 24. Due thereto, the temperatures of the water pipe 30 and the water pipe 32 rising can be suppressed. Moreover, in the present embodiment, because the bearing 26A of the control valve 26 is provided at the inner wall at the vehicle left side (the bending inner side) of the main pipe portion 20A of the exhaust heat recovery device 16, the temperature of this bearing 26A rising can be suppressed. This point is described in comparison with a comparative example of FIG. 4.

Figure 4:
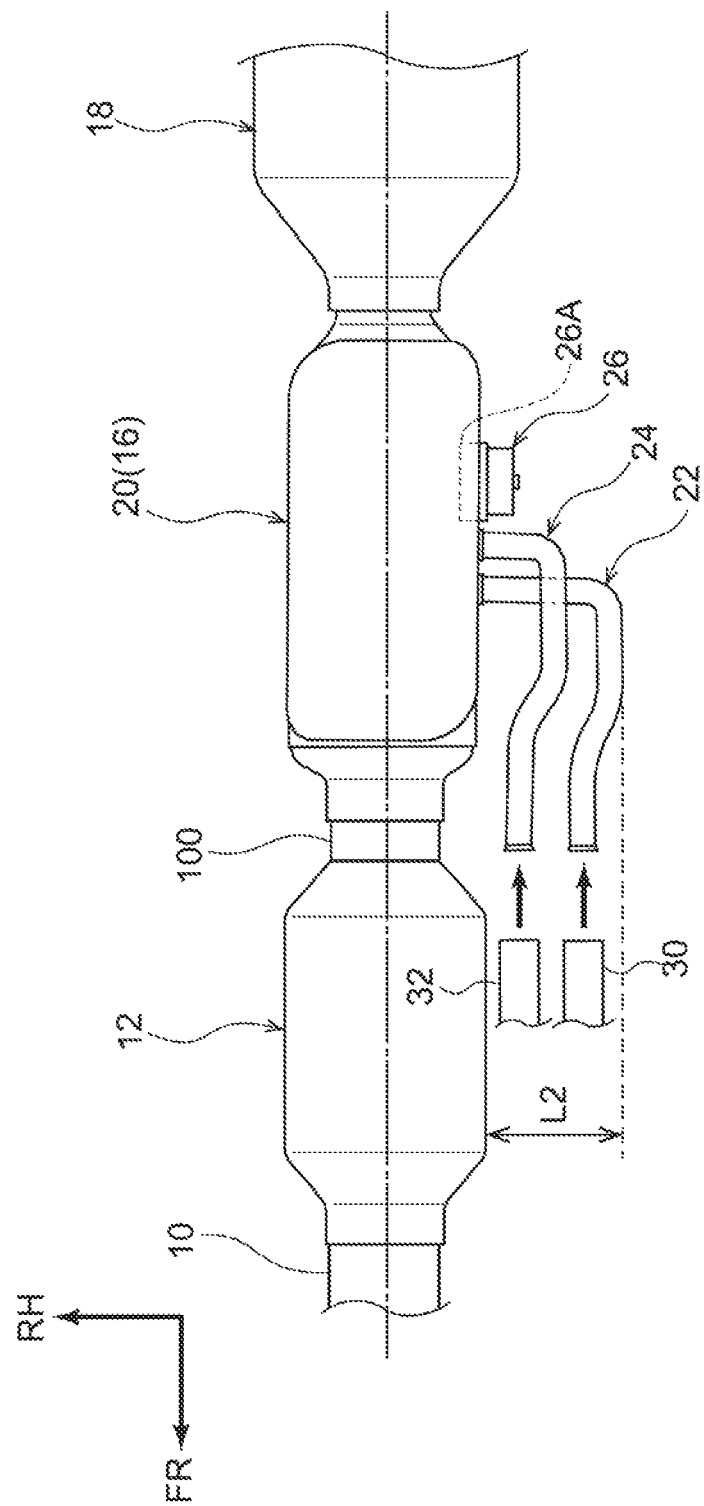
FIG. 4 is a plan view showing an exhaust heat recovery device structure relating to a comparative example.

As shown in FIG. 4, in a structure in which the catalytic converter 12 and the exhaust heat recovery device 16 are connected by a connecting pipe 100 that extends rectilinearly, the distance between the catalytic converter 12 on the one hand, and the metal pipe 22 and the metal pipe 24 on the other hand, becomes shorter than in the exhaust heat recovery device structure of the present embodiment. Namely, as seen in plan view, distance L1 from the outer surface at the vehicle left side of the catalytic converter 12 in FIG. 1 to the outer surface at the vehicle left side of the metal pipe 22, is longer than distance L2 from the outer surface at the vehicle left side of the catalytic converter 12 in FIG. 4 to the outer surface at the vehicle left side of the metal pipe 22. Therefore, in the present embodiment shown in FIG. 1, traveling wind can effectively hit the water pipe 30 and the water pipe 32 that are connected to the metal pipe 22 and the metal pipe 24. As a result, the temperatures of the water pipe 30 and the water pipe 32 rising can be suppressed. Namely, the water pipe 30 and the water pipe 32 deteriorating due to heat can be suppressed.

Further, in the comparative example shown in FIG. 4, the catalytic converter 12 and the exhaust heat recovery device 16 are connected rectilinearly. Therefore, the same amount of gas flows at the entire region of the exhaust heat recovery device 16. Therefore, gas is directly blown-out against the bearing 26A of the control valve 26 that is disposed at the interior of the exhaust heat recovery device 16, and there are cases in which the bearing 26A deteriorates. In contrast, as shown in FIG. 1, in the present embodiment, the catalytic converter 12 and the exhaust heat recovery device 16 are connected by the connecting pipe 14 that is bent. Therefore, much of the gas, that advances straight from the catalytic converter 12 and flows into the exhaust heat recovery device 16, flows along the inner wall at the vehicle right side of the exhaust heat recovery device 16 toward the vehicle rear side. In particular, in a case in which a large amount of gas flows, it is easy for the gas to flow along the inner wall at the vehicle right side due to inertia. Therefore, it is difficult for the gas to hit the bearing 26A, as compared with the comparative example of FIG. 4. Due thereto, the bearing 26A becoming high temperature and deteriorating due to the heat of the gas can be suppressed.

Moreover, in the present embodiment, the metal pipe 22 and the water pipe 30 are connected, and the metal pipe 24 and the water pipe 32 are connected, at positions that overlap the connecting pipe 14 as seen from the vehicle transverse direction. In this way, by placing the connected portion of the metal pipe 22 and the water pipe 30, and the connected portion of the metal pipe 24 and the water pipe 32, at positions that are far from the catalytic converter 12 and the exhaust heat recovery device 16, rising of the temperatures of the connected portions can be suppressed. Namely, the connected state of the metal pipe 22 and the water pipe 30, and the connected state of the metal pipe 24 and the water pipe 32, can be maintained well.

Although exhaust heat recovery device structures relating to embodiments of the present invention have been described above, these embodiments may be used by being appropriately combined, and the present invention can, of course, be implemented in various forms within a scope that does not depart from the gist thereof. For example, the present embodiment is structured such that, in FIG. 1, the bent portion 14C is provided at the connecting pipe 14, and the rear portion 14B of the connecting pipe 14 is bent toward the vehicle left side with respect to the front portion 14A. However, the present invention is not limited to this. For example, a connecting pipe in which the rear portion 14B is bent toward the vehicle right side with respect to the front portion 14A may be used. In this case, it is preferable to place the metal pipe 22 and the metal pipe 24 at the vehicle right side.

Further, a connecting pipe at which a curved portion is provided instead of the bent portion 14C may be used. In this case, for example, effects that are similar to those of the present embodiment can be obtained if there is made to be a structure in which the rear portion of the connecting pipe curves toward the vehicle left side with respect to the front portion.

Further, although the present embodiment is structured such that the main body portion 20 of the exhaust heat recovery device 16 has the main pipe portion 20A at the lower side and the bypass pipe portion 20B at the upper side, the present invention is not limited to this. For example, there may be a structure that is provided with two flow paths in the vehicle transverse direction. In this case, one flow path is made to be the main flow path that does not contribute to heat exchange, and the other flow path is made to be the bypass flow path that contributes to heat exchange.

Moreover, in the present embodiment, there is provided the control valve 26 that rotates and opens and closes the main flow path of the main pipe portion 20A, but the present invention is not limited to this. For example, a sliding-type valve may be used. Or, a valve of another type may be used. Moreover, although the bearing 26A of the control valve 26 is formed of a stainless wire mesh in the present embodiment, the bearing may be formed of another material.

Further, although the water pipe 30 and the water pipe 32 are formed from resin tube bodies in the present embodiment, the present invention is not limited to this. For example, the water pipe 30 and the water pipe 32 may be formed from pipe bodies that are made of metal. Note that, by forming the water pipe 30 and the water pipe 32 from tube bodies that are made of resin as in the present embodiment, manufacturing errors and assembly errors between the exhaust heat recovery device 16 and the pipes at the engine side can be absorbed. Therefore, it is preferable to form the water pipe 30 and the water pipe 32 from tube bodies that are made of resin.

What is claimed is:

1. An exhaust heat recovery device structure comprising:
   an exhaust pipe configured to receive exhaust gas generated by an internal combustion engine;
   a catalytic converter that is connected to the exhaust pipe;
   an exhaust heat recovery device configured to be connected, at a side of the exhaust heat recovery device, to a water pipe of cooling water that cools the internal combustion engine in order to carry out heat exchange between the cooling water and the exhaust gas; and
   a connecting pipe that connects the catalytic converter and the exhaust heat recovery device, and that is bent or curved toward the side of the exhaust heat recovery device to which the water pipe is configured to be connected and so that the exhaust heat recovery device is disposed at an incline with respect to a longitudinal direction of the exhaust pipe.

2. The exhaust heat recovery device structure of claim 1, further comprising:
the water pipe connected to the exhaust heat recovery device, wherein the water pipe is disposed at the bending inner side or a curving inner side of the connecting pipe.

3. The exhaust heat recovery device structure of claim 1, further comprising:
a metal pipe that extends from the exhaust heat recovery device,
wherein the exhaust recovery device is configured to be connected to the water pipe via the metal pipe at a position that overlaps the connecting pipe as seen from a transverse side of the connecting pipe.

4. The exhaust heat recovery device structure of claim 1, wherein the exhaust heat recovery device comprises:
a flow path of the exhaust gas, including a main flow path at which heat exchange with the cooling water is not carried out, and a bypass flow path at which heat exchange with the cooling water is carried out;
a valve that can open and close the main flow path or the bypass flow path; and
a bearing of the valve disposed at an inner wall of the exhaust heat recovery device and at the side of the exhaust heat recovery device to which the water pipe is configured to be connected.

5. The exhaust heat recovery device structure of claim 2, wherein the water pipe is a tube body made of resin and is configured to connect the exhaust heat recovery device to the internal combustion engine.

6. The exhaust heat recovery device structure of claim 2, further comprising:
a metal pipe that extends from the exhaust heat recovery device,
wherein the exhaust recovery device is connected to the water pipe via the metal pipe at a position that overlaps the connecting pipe as seen from a transverse side of the connecting pipe.

7. The exhaust heat recovery device structure of claim 6, wherein the water pipe is a tube body made of resin and is configured to connect the exhaust heat recovery device to the internal combustion engine.

* * * * *